E. E. DUFF.
TROLLEY HEAD.
APPLICATION FILED AUG. 11, 1909.

976,445.

Patented Nov. 22, 1910.

Witnesses

Francis Boyle

Inventor
Edward E. Duff
By C. A. Snow & Co.

UNITED STATES PATENT OFFICE.

EDWARD E. DUFF, OF SEATTLE, WASHINGTON, ASSIGNOR OF ONE-HALF TO DAVID V. ACKERMAN, OF MOUNT VERNON, WASHINGTON.

TROLLEY-HEAD.

976,445.     Specification of Letters Patent.     Patented Nov. 22, 1910.

Application filed August 11, 1909. Serial No. 512,426.

*To all whom it may concern:*

Be it known that I, EDWARD E. DUFF, a citizen of the United States, residing at Seattle, in the county of King and State of Washington, have invented a new and useful Trolley-Head, of which the following is a specification.

My invention relates to trolley poles, particularly to trolley pole heads and has for an object to provide a device of this character which will automatically adjust itself to any curve or obstruction along the over-head feed-wire.

Another object is to provide a device of this character which will maintain a constant contact with the feed-wire at all times to insure a positive connection between the trolley-head and trolley-pole, whereby the current may be transmitted uninterrupted to the controller of the car.

A further object is to provide a device of this character which will be simple and durable and will reduce the cost of manufacture and maintenance to a minimum.

With the above advantages and other objects in view, which will appear as the nature of the invention is better understood, my invention consists of the novel details of construction and combination of parts, illustrated in the accompanying drawing, shown in the following specification and set forth in the appended claim.

Figure 1:
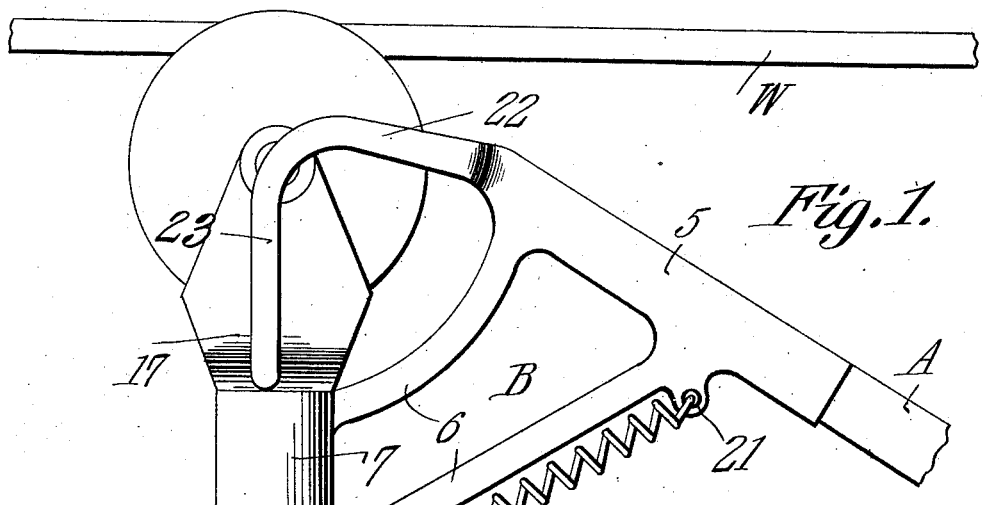
Figure 2:
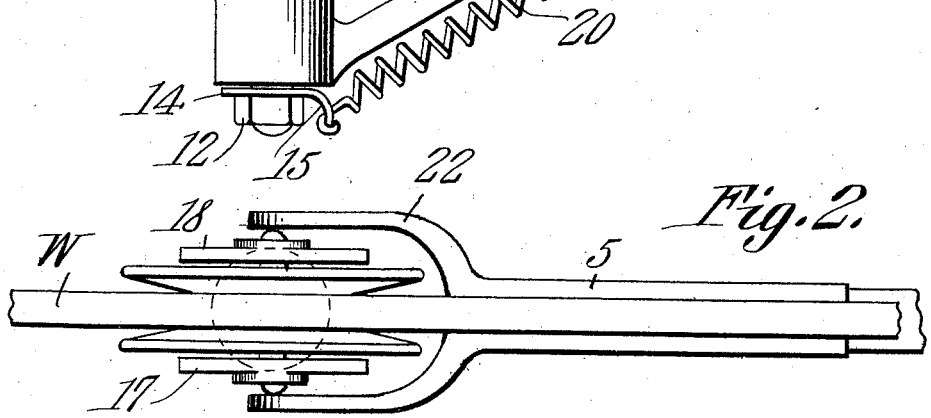
Figure 3:
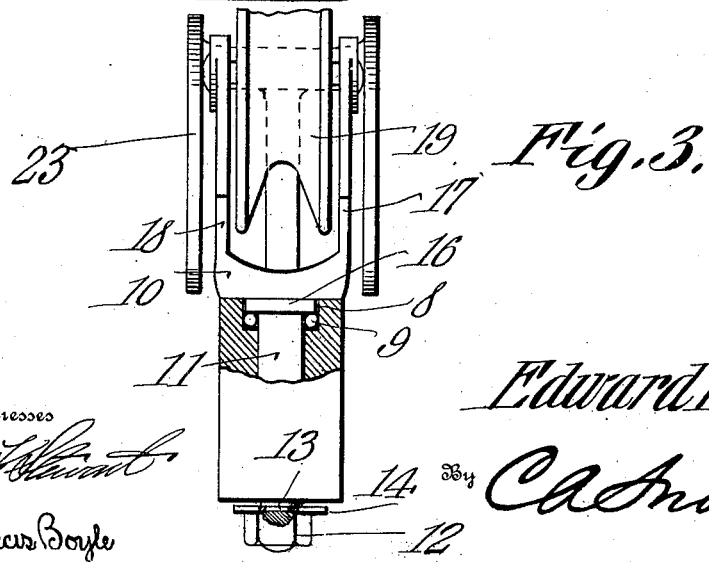

In the accompanying drawing: Figure 1 is a side elevation of a trolley-head constructed in accordance with my invention. Fig. 2 is a plan view of the same. Fig. 3 is an end elevation of the trolley-head showing a portion of the bearing head broken away to expose the bearings.

In a more detailed description of my invention in which like characters of reference designate similar parts in the views shown, A designates a portion of a trolley-pole and B designates the trolley-pole head in general. The trolley-head B comprises a shank portion 5 extending in axial alinement with the trolley-pole, and an angular bracket portion 6 extending downwardly from the shank portion. Rigidly secured to the bracket portion 6 is a tubular bearing head 7 which is disposed on the bracket portion at such an angle that it will lie in a vertical plane when the trolley-wheel is in operative contact with the wire. The upper surface of the tubular bearing is undercut to provide an annular groove or channel 8 constituting a race-way in which are arranged bearing balls 9, as shown.

Mounted for rotation in the bore of the tubular bearing head is a trolley wheel support 10 the cylindrical shank 11 of which is sufficient in length to extend beneath the lower side of the head where it is reduced in diameter and provided with screw threads for engagement with a nut 12 by means of which the wheel-support is retained from jumping out of the head, should the trolley wheel accidentally leave the feed-wire and strike one of the guy wires. A washer 14 is located upon the reduced end portion of the shank 11 and is provided with a downwardly disposed lug 15. The nut 12 is screw threaded upon the reduced end portion of the shank 11 and clamps the washer 14 against the upper larger portion of the said shank 11.

That portion of the wheel support adjacent the upper end of the shank is provided with an angular bearing shoulder 16 which projects into the race-way 8 formed in the upper surface of the bearing head and bears upon the bearing balls, as shown. Extending upwardly from the shank portion of the wheel support are arms or standards 17 and 18, the upper terminals of which are provided with suitably alined bearings in which are journaled the ends of the shaft of the trolley-wheel or collector 19.

For normally holding the trolley-wheel in the plane of the trolley-pole a spiral spring 20, formed from spring wire sufficiently stout to prevent the parts from playing too freely, is disposed beneath and parallel with the bracket portion 6 of the trolley-head. This spring is connected at one end to a lug 21 projecting laterally from the sides of the angular bracket portion 6 and is made fast at the opposite end to the before mentioned lug 15 projecting from the washer 14.

It is evident from the above construction that the trolley wheel will, by virtue of the rotary wheel-support be adjustable to conform to any curve or irregularity along the feed-wire, and will, at all times be maintained in positive electrical contact with said wire.

It will be seen that the spring 20 normally holds the trolley-wheel in alinement with the trolley-pole, and will return the wheel to its initial position as soon as the car has passed a curve or obstruction in the over-head feed-wire.

To prevent the spring from being struck and injured, should the trolley-wheel fly off the feed-wire, a guard or fork 22 is formed integral with the extreme upper portion of the shank of the trolley-head. The prongs of the fork are bent downwardly intermediate the ends to form arms 23 against which the branches 17 and 18 may strike whereby to limit the rotary movement of the trolley wheel support. The fork 22 is sufficient in compass to permit the trolley-wheel to rotate in an arc sufficient to accommodate itself to any of the various curves along the feed-wire. It will be seen that, should the trolley wheel leave the wire, the guy wire instead of striking the bearings or trolley wheel will strike against the arms of the fork and be directed outwardly from the sides of the head.

From the foregoing description, taken in connection with the accompanying drawing, it is thought that the construction and operation of my invention will be easily understood without a more extended explanation.

What is claimed is:—

In combination with a trolley pole, a head comprising a shank portion extending in axial alinement with said pole and an angular bracket portion extending downwardly from said shank portion, a fork at the outer end of said shank portion, a tubular bearing at the outer end of said bracket portion, a wheel support having a shank revolubly mounted in said bearings, said shank terminating at one end in a reduced end, a washer mounted upon said reduced end and having a down-turned lug, a wheel journaled in said wheel support, a spring carried by said head extension and connected with said washer, and a nut screwed upon the reduced end portion of the shank and clamping the washer against the end of the larger portion of the shank.

In testimony that I claim the foregoing as my own, I have hereto affixed my signature in the presence of two witnesses.

EDWARD E. DUFF.

Witnesses:
J. D. BAUER,
WILLIAM E. FROUDE.